(12) United States Patent
Suman (10) Patent No.: US 9,807,167 B2
(45) Date of Patent: Oct. 31, 2017

(54) SYSTEM AND METHOD FOR OPTIMALLY MANAGING HETEROGENEOUS DATA IN A DISTRIBUTED STORAGE ENVIRONMENT

(71) Applicant: Wipro Limited, Bangalore (IN)

(72) Inventor: Abhishek Suman, Nalanda (IN)

(73) Assignee: Wipro Limited, Bangalore (IN)

( * ) Notice: Subject to any disclaimer, the term of this patent is extended or adjusted under 35 U.S.C. 154(b) by 471 days.

(21) Appl. No.: 14/542,221

(22) Filed: Nov. 14, 2014

(65) Prior Publication Data

US 2016/0088084 A1    Mar. 24, 2016

(30) Foreign Application Priority Data

Sep. 24, 2014  (IN) ............................ 4676/CHE/2014

(51) Int. Cl.
*G06F 15/16* (2006.01)
*H04L 29/08* (2006.01)
*G06F 3/06* (2006.01)
*G06F 12/02* (2006.01)

(52) U.S. Cl.
CPC ............ *H04L 67/1097* (2013.01); *G06F 3/06* (2013.01); *G06F 12/023* (2013.01); *G06F 2212/1016* (2013.01)

(58) Field of Classification Search
CPC .................................................. H04L 67/1097
See application file for complete search history.

(56) References Cited

U.S. PATENT DOCUMENTS

| 2003/0110263 | A1* | 6/2003 | Shillo ................... G06F 3/0601 709/226 |
| 2004/0103206 | A1* | 5/2004 | Hsu ....................... H04L 69/329 709/230 |
| 2004/0215772 | A1* | 10/2004 | Dinker ................... H04L 29/06 709/225 |
| 2009/0019059 | A1* | 1/2009 | Ricart ............... G06F 17/30067 |
| 2014/0149794 | A1* | 5/2014 | Shetty ................. H04L 67/1095 714/20 |
| 2014/0298347 | A1* | 10/2014 | Aylesworth ........ G06Q 10/0631 718/104 |
| 2015/0256391 | A1* | 9/2015 | Hardy ................. H04L 41/0806 709/222 |

* cited by examiner

*Primary Examiner* — Brian Whipple
(74) *Attorney, Agent, or Firm* — LeClairRyan, a Professional Corporation (57) ABSTRACT

This technology relates to data management computing apparatuses, methods, and non-transitory computer-readable media that optimally manage heterogeneous data in a distributed environment in real time. The method comprises initializing a first storage pool capable of storing data from one or more sources, the first storage pool being distributed across one or more computing devices. Then data from the one or more sources may be stored in the first storage pool. Subsequently, one or more memory pools may be generated in a second storage pool based on amount of data to be stored in the first storage pool and one or more parameters associated with the data stored in the first storage pool. Finally, metadata is created in a first memory pool of the one or more memory pools for the data stored in the first storage pool, the metadata capable of retrieving the data stored in the first storage pool in real-time.

17 Claims, 3 Drawing Sheets

FIG. 3: Example Computer System

SYSTEM AND METHOD FOR OPTIMALLY MANAGING HETEROGENEOUS DATA IN A DISTRIBUTED STORAGE ENVIRONMENT

This application claims the benefit of Indian Patent Application No. 4676/CHE/2014 filed Sep. 24, 2014, which is hereby incorporated by reference in its entirety.

FIELD

This technology relates generally to managing data, and more particularly but not limited to optimally managing heterogeneous data in a distributed storage environment in real time.

BACKGROUND

In present day scenario, considering the exponential increase in data storage requirements and drastic reduction in storage cost per gigabytes, aggressive optimization of data written to storage media is not seriously taken. This leads to generation of extremely large unmanaged datasets distributed across multiple systems, cloud based systems, and various other places. Querying these large datasets entails efforts as it is not known which data lies where. Further, there are no mechanisms available for creating common index for pulling out data from extremely large datasets spread across various systems and for handling such data efficiently.

Currently, the data is spread across multiple servers which are interconnected with each other. Various techniques are being developed to leverage the collective power of all the interconnected servers. The main problem is how to efficiently make use of data resources spread across servers available as a single pool of resources for data processing applications, i.e., how to deal with extremely large datasets, for example, (archived official datasets for a company, video surveillance data, web crawled data for search engine) which may be only unstructured data and is continuously expanding with time. The main problems associated with such kind of data are as follows:

Lack of proper centralized yet distributed storage space
Lack of computing services available for the given data size.
No proper access mechanism.
Data is unstructured.
Access is very low.

In view of the above drawbacks, it would be desirable to have a mechanism to use large datasets spread across systems in an efficient and fault tolerant manner in real time.

SUMMARY

Disclosed herein is a method for optimally managing heterogeneous data in a distributed storage environment. The method includes initializing a first storage pool capable of storing data from one or more sources, the first storage pool being distributed across one or more computing devices; storing data from the one or more sources in the first storage pool; generating one or more memory pools in a second storage pool based on amount of data to be stored in the first storage pool and one or more parameters associated with the data stored in the first storage pool; and creating metadata in a first memory pool of the one or more memory pools for the data stored in the first storage pool, the metadata capable of retrieving the data stored in the first storage pool in real-time.

In another aspect of this technology, a data management computing apparatus that optimally manages heterogeneous data in a distributed storage environment is disclosed. The data management computing apparatus includes one or more hardware processors and a computer-readable medium storing instructions that, when executed by the one or more hardware processors, cause the one or more hardware processors to perform operations. The operations may include initializing a first storage pool capable of storing data from one or more sources, the first storage pool being distributed across one or more computing devices; storing data from the one or more sources in the first storage pool; generating one or more memory pools in a second storage pool based on amount of data to be stored in the first storage pool and one or more parameters associated with the data stored in the first storage pool, the second storage pool being distributed across the one or more computing devices; and creating metadata in a first memory pool of the one or more memory pools for the data stored in the first storage pool, the metadata capable of retrieving the data stored in the first storage pool in real-time.

In yet another aspect of this technology, a non-transitory computer-readable medium storing instructions for optimally managing heterogeneous data in a distributed storage environment that, when executed by the one or more hardware processors, cause the one or more hardware processors to perform operations is disclosed. The operations may include initializing a first storage pool capable of storing data from one or more sources, the first storage pool being distributed across one or more computing devices; storing data from one or more sources in the first storage pool; generating one or more memory pools in a second storage pool based on amount of data to be stored in the first storage pool and one or more parameters associated with the data stored in the first storage pool, the second storage pool being distributed across the one or more computing devices; and creating metadata in a first memory pool of the one or more memory pools for the data stored in the first storage pool, the metadata capable of retrieving the data stored in the first storage pool in real-time.

Additional objects and advantages of this technology will be set forth in part in the following detailed description, and in part will be obvious from the description, or may be learned by practice of the present disclosure. The objects and advantages of the present disclosure will be realized and attained by means of the elements and combinations particularly pointed out in the appended claims.

BRIEF DESCRIPTION OF THE DRAWINGS

The accompanying drawings, which constitute a part of this specification, illustrate several embodiments and, together with the description, serve to explain the disclosed principles. In the drawings.

DETAILED DESCRIPTION

As used herein, reference to an element by the indefinite article "a" or "an" does not exclude the possibility that more than one of the element is present, unless the context requires that there is one and only one of the elements. The indefinite article "a" or "an" thus usually means "at least one." The disclosure of numerical ranges should be understood as referring to each discrete point within the range, inclusive of endpoints, unless otherwise noted.

As used herein, the terms "comprise," "comprises," "comprising," "includes," "including," "has," "having," "contains," or "containing," or any other variation thereof, are intended to cover a non-exclusive inclusion. For example, a composition, process, method, article, system, apparatus, etc. that comprises a list of elements is not necessarily limited to only those elements but may include other elements not expressly listed. The terms "consist of," "consists of," "consisting of," or any other variation thereof, excludes any element, step, or ingredient, etc., not specified. The term "consist essentially of," "consists essentially of," "consisting essentially of," or any other variation thereof, permits the inclusion of elements, steps, or ingredients, etc., not listed to the extent they do not materially affect the basic and novel characteristic(s) of the claimed subject matter.

The present disclosure relates to a data management computing apparatus and a method for leveraging a combination of distributed memory management and the distributed data management. A centralized memory spread across systems is integrated with a persistent storage spread across the systems where data can reside efficiently with custom built algorithms for efficient access to the data.

The system is based on a centralized and distributed architecture both, where a data index or metadata (location of data, access rights etc.) is placed centrally in one or more memory pools and actual data is stored locally across multiple systems, contributing part of the one or more memory pools. In this way, each system knows location of all files present while holding a small part of the data. Similar data is categorized together. This helps the system to browse across similar categories efficiently. When a user wants a particular data, he only needs to access the metadata which is stored centrally in the one or more memory pools. Since the metadata has information about the location of data present across systems, a stream of requested data is redirected back to the user instantly.

Figure 1:
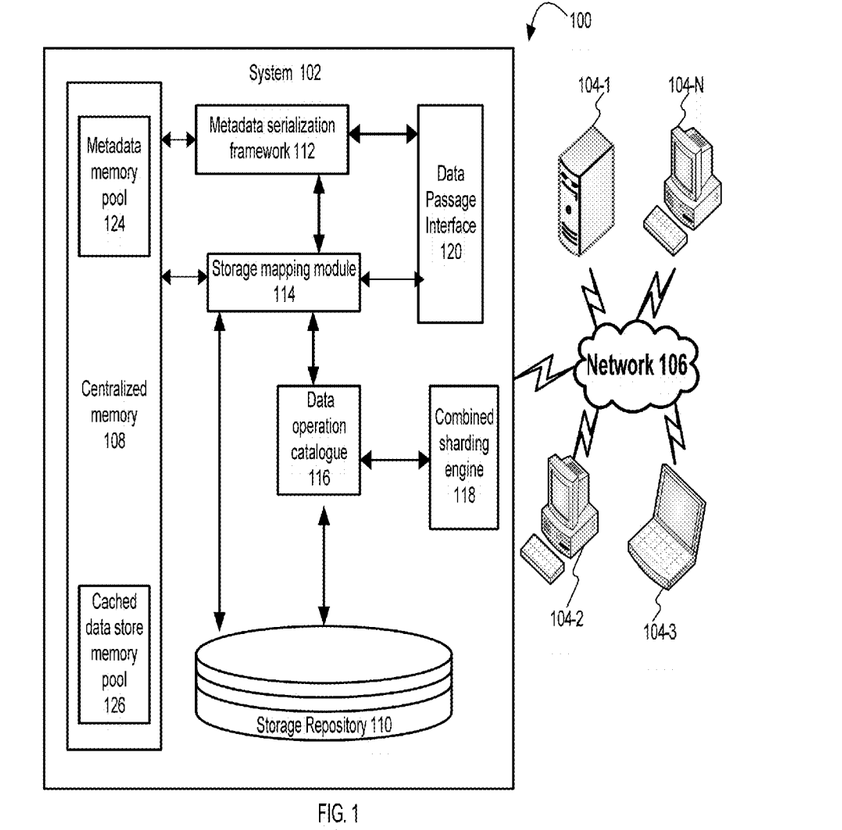
FIG. 1 is a block diagram of a network environment with a functional diagram of a data management computing apparatus that optimally manages heterogeneous data in real time among a plurality of devices in a network, according to some embodiments of the present disclosure.

FIG. 1 illustrates a network environment 100 incorporating a data management computing apparatus 102 that optimally manages data in real time among a plurality of devices 104 in a network 106, according to some embodiments of this technology.

The data management computing apparatus 102 may be implemented in a variety of computing systems, such as a laptop computer, a desktop computer, a notebook, a workstation, a mainframe computer, a server, a network server, and the like. Further, as shown in FIG. 1, the plurality of devices 104-1, 104-2, 104-3, 104-N are communicatively coupled to each other and to the data management computing apparatus 102 through the network 106 for facilitating one or more end users to access and/or operate the data management computing apparatus 102.

Further, the data management computing apparatus 102 may aggregate physical memory of the plurality of devices 104-1, 104-2, 104-3, 104-N, collectively referred to as devices 104 and individually referred to as device 104, to create a pool of memory resources. Examples of the devices 104 include, but are not limited to, a desktop computer, a portable computer, a server, a handheld device, and a workstation. The devices 104 may be used by various stakeholders or end users, such as system administrators and application developers. In one implementation, the data management computing apparatus 102 may be configured in at least one of the device 104 to aggregate the memory of the plurality of devices 104.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices, etc.

Figure 3:
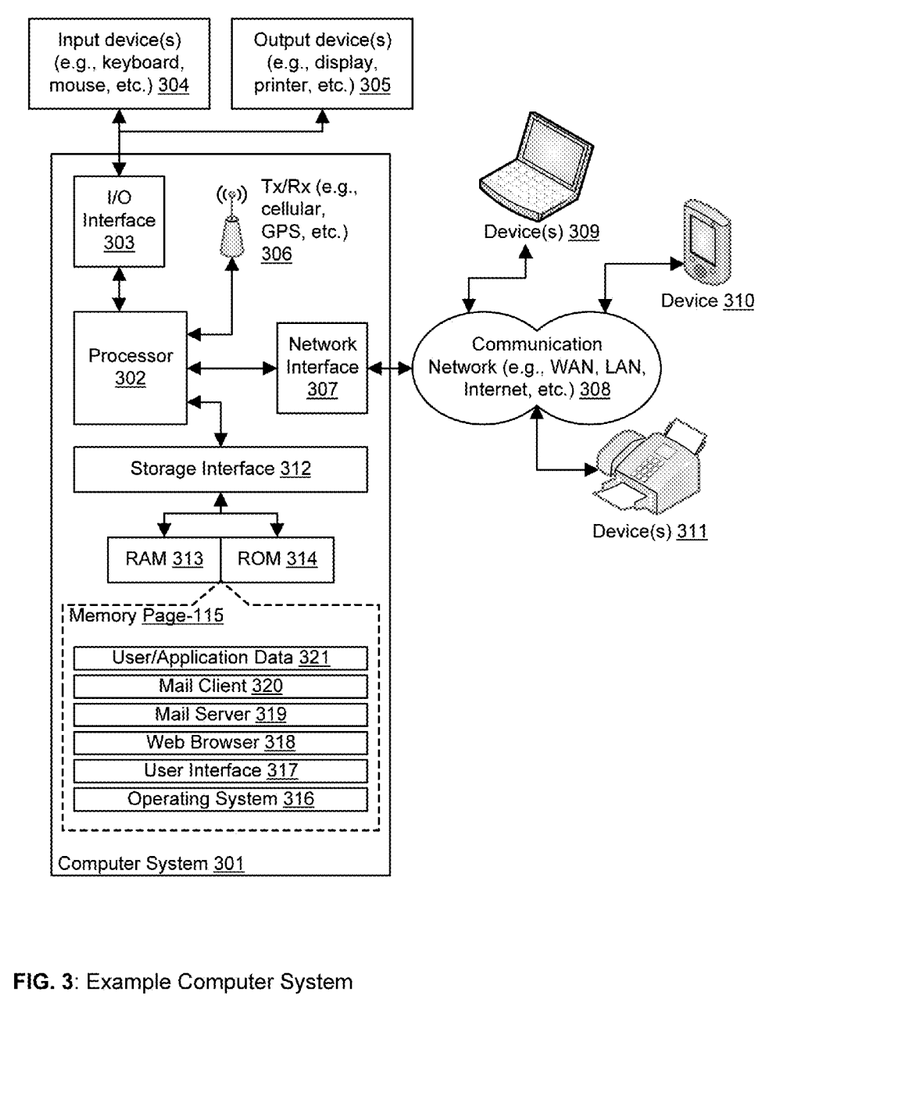
FIG. 3 is a block diagram of an example of the data management computing apparatus for implementing embodiments consistent with the present disclosure.

The data management computing apparatus 102 may include a processor (not shown in FIG. 1), a memory (not shown in FIG. 1) coupled to the processor, and interfaces (not shown in FIG. 1) which are illustrated in the corresponding block diagram of the data management computing apparatus 301 which may implement the functionality illustrated in the functional block diagram of the data management computing apparatus 102 shown in FIG. 1. The processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute computer-readable instructions stored in the memory. The memory can include any non-transitory computer-readable medium known in the art including, for example, volatile memory (e.g., RAM), and/or non-volatile memory (e.g., EPROM, flash memory, etc.).

The interface(s) may include a variety of software and hardware interfaces, for example, a web interface, a graphical user interface, etc., allowing the data management computing apparatus 102 to interact with the devices 104. Further, the interface(s) may enable the data management computing apparatus 102 respectively to communicate with other computing devices. The interface(s) can facilitate multiple communications within a wide variety of networks and protocol types, including wired networks, for example LAN, cable, etc., and wireless networks such as WLAN, cellular, or satellite. The interface(s) may include one or more ports for connecting a number of devices to each other or to another server.

As shown in FIG. 1, the data management computing apparatus 102 may include a centralized memory 108, a storage repository 110, a metadata serialization manager 112, a storage mapping module 114, a data operation catalogue 116, a combined sharding engine 118, and a data passage interface 120. The centralized memory 108 may be volatile random access memory (RAM) whereas the storage repository may be nonvolatile persistent storage like hard disk drive or solid state drive devices. In an exemplary embodiment, suppose there are 20 servers, each server having 20 GB of HDD/SDD storage. Each server may contribute 4 GB of HDD/SDD towards a unified pool of memory resources having a total memory of 80 GB. The 80 GB memory results out of an aggregation of physical memory resources of each of the servers. This aggregation would present itself as a unified pool of memory resources. Both the centralized memory 108 and the storage repository 110 may be spread across the devices 104 which may be connected to each other and contributing to be a part of the pooled memory resources. A plurality of services run on the devices 104 to which all the memory resources present in various devices 104 are exposed. These services may be used to glue all the memory spread across devices 104 and make it available as single pool of memory, for example, the centralized memory 108 for memory-intensive applications to run efficiently. If a new device 104 is installed in the network environment 100, the service may be installed in the system automatically. The service may expose the memory in the device 104 in which it is running. All the exposed memory resources spread across the devices 104 may be linked. After linking all the memory resources exposed by the services, the exposed memory resources may be made available as single pool of unified resources, specifically memory.

The centralized memory 108 may comprise one or more memory pools generated by a communicatively coupled metadata serialization manager 112. In an exemplary embodiment, the one or more generated memory pools may be metadata memory pool 124 and cached data store memory pool 126.

Each device 104 contributing to be the part of centralized memory 108 has an underlying persistent storage space whose storage capacity is usually more than 100× larger than the memory contributing to be part of the centralized memory 108. This storage may be used for high volume data repository 110 handling heterogeneous varieties of data spread across persistent storage in the devices 104. The details of each file stored in the distributed repository 110 may be updated in the metadata stored in the metadata memory pool 124. The updating of the metadata happens by collecting details from the storage mapping module 114 by the metadata serialization manager 112.

The metadata serialization manager 112 may accept details of the data stored in persistent storage and updates the metadata stored in the centralized memory 108. After getting the updates, it may access data maps from the storage mapping module 114 for each file which is then serialized and converts it into memory objects for in-memory access. Data maps may be combined details of each file stored in the storage repository 110. The metadata serialized objects may be also written in file system in the storage repository 110 redundantly in defined time intervals for recovering from failures. The metadata details may be captured from the storage mapping module 114. The details may include following parameters which can increase over time:—Location of actual data files spread across multiple devices 104, file permission details, concurrent access rights and exclusive access details, data criticality (no. of data copies to maintain across the devices 104 for fault tolerance), data shard details, file status (Deleted, Writing in progress, streaming data, file cached in the cached data store memory pool or not or pending for deletion etc.)

The storage mapping module 114 may be designed for taking updates from the data operation catalogue module 116, the storage repository 110, and centralized memory 108 to create an overall map of data stored in persistent storage in the storage repository 110. The created map contains details captured from all the modules it is interacting with. For example It has index of all the operations performed on the given data set with the help of data operation catalogue module 116, it has the current location and details about all the copies of the given data set using storage repository 110 and also when the given data set is cached in cached data store memory pool 126 the same is updated in the map. This map may be forwarded to the metadata serialization manager 112 for updating the overall metadata status in the metadata memory pool. The caching status of each file may be available with the storage mapping module 114 since it has direct access to the storage repository 110 and cached data store memory pool 126.

Further, the data passage interface 120 may be single point of contact in the data management computing apparatus 102 where an end user can interact with the data management computing apparatus 102. The data passage interface 120 may be responsible for handling all the input and output operations happening in the data management computing apparatus 102. Whenever there is a read request for any file stored in the system, it is catered via the data passage interface 120 which interacts with metadata stored in the metadata memory pool 124 using the metadata serialization framework 112 and the storage mapping module 114. Despite the data is present in cached data store memory pool 126, same may be served to the data passage interface 120 using the storage mapping module 114. This interface may also provide frequency of access of each file to the storage mapping module 114 which helps in caching frequently accessed data from the cached data store memory pool 126 in the centralized memory 108 for even faster access.

All tasks related to data writing in the distributed storage layer in the storage repository 110 may be handled by the combined sharding module 118. This module has an intelligent sharding engine which may detect the type of file and categorize them accordingly. A user may also specify a custom type which can help him/her to categorize files according to his need. If a file type is not detected by this module or a user has enforced no file type detection then the file is directly stored in one of the available persistent storage with ample space. The sharding details and location of file in persistent storage may be forwarded to the data operation catalogue module 116 which may help in updating the storage mapping module 114 and the overall metadata of the storage repository 110.

A real-time data repository 110 should provide enough performance which qualifies to be real-time and still provide most of the I/O operations on its data. The data operation catalogue module 116 may be responsible for handling and processing all the JO operations performed in the system. The data operation catalogue module 116 may majorly provide upload, download, delete and append operations. Operations are not limited by these four types and can extend over time.

When a user uploads a file in the data passage interface 120, it may be routed via the combined sharding module 118 which decides when to place the file according to the shard hints given or the file type uploaded. A user may also specify the data criticality of the file so that the data management computing apparatus 102 may redundantly place multiple copies of same file in the storage repository 110 for fault tolerance. After the file upload is completed the same information (including the location of multiple copies) may be updated in the metadata memory pool 124 using the storage mapping module 114 and the metadata serialization manager 112.

For handling a file request operation, the data passage interface 120 may interact with the storage mapping module (after getting storage location from the metadata serialization manager 112) for nearest copy of requested data which can be served to the requester.

When an update/append or delete operation is requested in the data passage interface 120, same operation may be repeated for finding the nearest location of data using the storage mapping module 114. Here a user may specify whether to retain old copy of data or not. Even if the user has requested not to keep an old copy, still the storage repository 110 may retain an older version of the data based on the free space available in the storage repository 110 and a configured amount of time defined in the storage repository 110.

The data operation catalogue module 116 may include a data access index creator 128 and a metadata integrator 130. The data management computing apparatus 102 may handle multiple users at the same time for accessing same data. Accessing same data may cause corruption when more than one user is updating the same file. For avoiding this problem the storage repository 110 has a connection to centralized memory pools which has an API module exposed to cater the access mechanism for each file stored in the storage repository 110. It uses concept of Semaphore and Mutual exclusion where multiple users can effectively access files concurrently based on the status of semaphore and mutex index. In an exemplary embodiment, basically if a file has a semaphore value of five then the repository would allow five concurrent users to access same file without corruption. Mutual exclusion provides an exclusive access to file which only one user can access. Mutex is mostly required for update operations on the stored data.

The work of the metadata integrator may be to aggregate access details about each file stored in the storage repository 110 and update the same in metadata using storage mapping module 114 and the metadata serialization manager 112. To avoid data corruption by allowing more than defined access to a single file, the metadata integrator may actively updates the status of each file stored in the system since users may access files continuously and access index can increase and decrease frequently.

Figure 2:
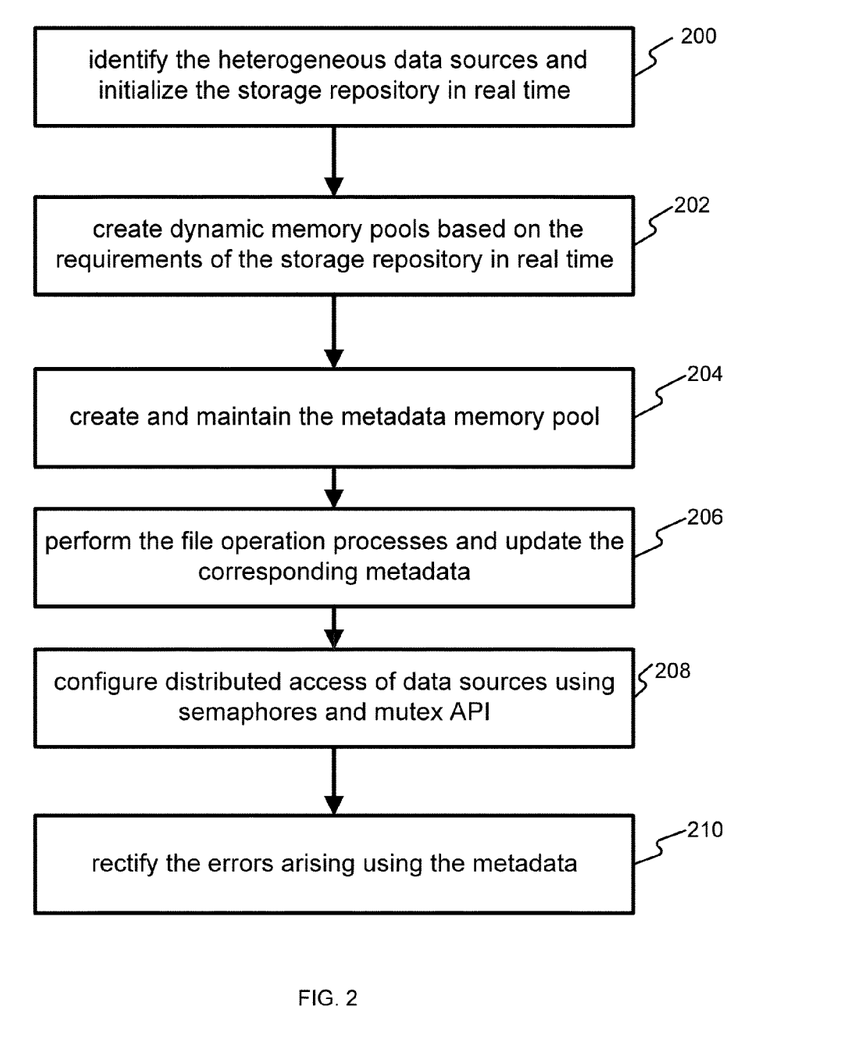
FIG. 2 is a flowchart of an exemplary method for optimally managing heterogeneous data among the plurality of devices in the network in real time, according to some embodiments of the present disclosure.

FIG. 2 is a flowchart of an example of a method for optimally managing data among a plurality of devices 104 in a network 106 in real time according to some embodiments of this technology. The method may be executed by the system 100 as described in further detail below. It is noted however, the functions and/or steps of FIG. 2 as implemented by data management computing apparatus 102 may be provided by different architectures and/or implementations without departing from the scope of this technology.

Referring to FIG. 2, at step 200, identify the heterogeneous data sources and initialize the storage repository 110 in real time. In this initializing step, once the sources, i.e., the devices 104 have been identified, the instructions may be given to the data management computing apparatus 102 for initializing the storage repository 110. The initialization starts all the required services on the devices 104 and provides information parameters of the centralized memory 108 and total persistent storage, i.e. the storage repository 110. After the services have been initialized and capacity details are circulated across the servers, the storage repository 110 may be made available for use.

At step 202, create dynamic memory pools based on the requirements of the storage repository 110 in real time. Once the storage repository 110 is available for use, the data loading may be started after creating one or more memory pools in the centralized memory 108. As discussed earlier, the one or more memory pools may comprise metadata memory pool 124 and cached data store memory pool 126.

The metadata memory pool 124 and cached data store memory pool 126 are defined as follows:

Meta Data memory pool—The storage repository 110 is serving requests in real-time with instant access to any file requested among a large collection of heterogeneous files. This is achieved by various mechanisms built in the storage repository 110 like caching mechanism, in-memory access to file location, dedicated metadata memory pools of large size for proper working and access to the persistent storage etc. All these mechanism details are accessed in fraction of seconds for serving real-time requests by storing them in the centralized memory 108 in form of metadata. The metadata are the serialized memory objects which hold the details of each file stored in the storage repository 110, location of nearest copy, state of file, no of users connected, cached file details, no of memory pools used etc.

Cached Data Store memory pool—Cached Data Store memory pool is cache storage for files which are frequently accessed by the data management computing apparatus 102. This may be required to reduce overall load on the storage repository 110 only. After a defined frequency of access, the data passage interface 120 may instruct the storage mapping module 114 to cache a given file for even faster access. The status of file may be then updated in the metadata memory pool 124 and the next access to the same file may be served from the cache data store memory pool 126 without bothering the storage repository only.

The number and size of these memory pools are based on the amount of data to be loaded in the system and various other parameters like future memory requirements, data access policies, data redundancy details etc. One of the Memory pool, i.e. metadata memory pool 124 is dedicated for handling the metadata for all the data stored in the storage repository 110. This metadata has all the details about the data stored. The metadata includes the location of the data, access policies, number of copies, status of the data, retention period etc. Also it has the details about the nearest copy of the data across the devices 104 to serve in lowest time possible. All the operations performed in the storage repository 110 are handled by the APIs provided.

At step 204, create and maintain the metadata memory pool. The storage repository 110 may be serving heterogeneous data in real-time. This speed may be maintained with the help of various memory pools present in the centralized memory 108. One of the memory pools, i.e., metadata memory pool 124 handles the metadata of all the data in the stored in the storage repository 110.

All the metadata details which are stored in a dedicated metadata memory pool 124 may act as the contact point for the files stored in the storage repository 110. The information stored with metadata is very critical and the storage repository 110 cannot afford to lose this information. Thus this metadata which is present in the metadata memory pool 124 may be redundantly stored in the storage repository 110 which comprises the persistent storage. Persistent Storage may be the hardware storage (HDD/SSD etc) devices present in all the devices 104 for storing data. Also whenever this storage repository 110 is restarted, instead of creating the metadata index again it may directly read this information flushed to the persistent storage and validates against it for any changes. This saves overall time and makes it more efficient.

Further, devices 104 may fail from time to time which is collectively the part of heterogeneous storage repository 110. This will result in overall change in the available resources, specifically the overall available resources will reduce by the amount these failed systems were providing to the repository. Whenever there may be a change in the configuration of a system when failure happens, the update may be distributed instantly to all other devices 104 to update them accordingly. Thus the current state of the storage repository 110 may be always transparent to the user to avoid any unknown failures, data corruption or data loss.

At step 206, perform the file operation processes and update the corresponding metadata. One of the operation is uploading file operation. Whenever a file is uploaded in the storage repository 110, based on the available space the file is stored in the appropriate location. During upload only the user has to specify the criticality of the file so that the storage repository can place multiple copies of the given file across the devices 104. The details are then updated to metadata.

Another operation is downloading file operation. When a file download is initiated, the data management computing apparatus 102 may automatically identify the nearest copy of the requested file across the devices 104 using the in-memory metadata. It may then redirects the requester to that file copy.

Yet another operation is deleting/updating the operation. When a file is deleted or updated in the real-time file system, the deleted or older version of file is maintained at a separate location and the same is updated in in-memory metadata. The retention period of the deleted data can be configured in the repository.

It is to be noted that present disclosure is not limited to above stated four operations. There may be other operations also.

At step 208, configure distributed access of data sources using semaphores and mutex API. The files stored in the storage repository 110 may be configured to be accessed in real-time. Also, there may be a requirement when a single file stored in the persistent storage may be accessed by multiple users of the storage repository 110. This kind of access is fine when there is only a read request by the users. But in cases where multiple users are accessing it for read and write operations, the data might get corrupted. To handle such situations an APIs module may be provided to configure distributed access in persistent storage also. The distributed access uses the concept of semaphores and mutual exclusion for defining access. One a user acquired a mutex lock over a file it can't be access by any other users and a wait flag is given to them. In situations where multiple accesses may be provided, semaphores are used. The number of semaphores defines the number of users. For example, when a user has got a semaphore access the total count of semaphore is reduced by one thus the number of simultaneous access is also reduced. When the operation is finished again the semaphore index is increased by one. All the distributed related details are accessed and updated using metadata access.

At step 210, rectify the errors arising using the metadata. In case of an error arising out of failure of one or two devices 104, the information is quickly circulated to the metadata memory pool 124 which then initiates the creation of new copies whose redundancy has decreased after the system failure. Also the overall state and space available in the storage repository is updated in the metadata.

Exemplary Computer System

FIG. 3 is a block diagram of an exemplary data management computing apparatus 301 for implementing embodiments consistent with this technology including by way of example the data management computing apparatus 102 shown in FIG. 1. Variations of data management computing apparatus 301 may be used for implementing any of the devices and/or device components presented in this disclosure, including data management computing apparatus 102. Data management computing apparatus 301 may comprise a central processing unit (CPU or processor) 302. Processor 302 may comprise at least one data processor for executing program components for executing user- or system-generated requests. A user may include a person using a device such as such as those included in this disclosure or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the data management computing apparatus 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 518-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the data management computing apparatus 301 may communicate with devices 309. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the data management computing apparatus 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the data management computing apparatus 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/ 7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the data management computing apparatus 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the data management computing apparatus 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the data management computing apparatus 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the data management computing apparatus 301 may implement a mail client 320 stored program component. The mail client may be a mail viewing application, such as Apple Mail, Microsoft Entourage, Microsoft Outlook, Mozilla Thunderbird, etc.

In some embodiments, data management computing apparatus 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with this technology. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:
1. A method for optimally managing data in a distributed storage environment, the method comprising:

initializing, by a data management computing apparatus, a first storage pool capable of storing data from one or more sources, the first storage pool being distributed across one or more computing devices;

storing, by the data management computing apparatus, data from the one or more sources in the first storage pool;

generating, by the data management computing apparatus, one or more memory pools in a second storage pool based on amount of data to be stored in the first storage pool and one or more parameters associated with the data stored in the first storage pool;

creating, by the data management computing apparatus, metadata in a first memory pool of the one or more memory pools for the data stored in the first storage pool, the metadata capable of retrieving the data stored in the first storage pool in real-time;

identifying, by the data management computing apparatus, a failure in at least one of the one or more computing devices;

circulating, by the data management computing apparatus, the information regarding the failure to the metadata stored in the second storage pool;

creating, by the data management computing apparatus, one or more redundant copies of the data corrupted by the failure; and updating, by the data management computing apparatus, the metadata in response to creating one or more redundant copies of the data.

2. The method of claim 1, wherein the metadata comprises at least one of location of the data, access rights associated with the data, number of copies of the data, status of the data, retention period of the data, location of the nearest copy of the data across the one or more computing devices.

3. The method of claim 1, further comprising:
performing, by the data management computing apparatus, one or more operations associated with the data stored in the first storage pool; and
updating, by the data management computing apparatus, the metadata in the second storage pool in response to performing the one or more operations associated with the data stored in the first storage pool.

4. The method of claim 1, further comprising;
receiving, by the data management computing apparatus, a request to retrieve a first data from the first storage pool;
fetching, by the data management computing apparatus, a map indicative of the location of the first data in the first storage pool; and
fetching, by the data management computing apparatus, a nearest copy of the first data using the map.

5. The method of claim 1, wherein initializing the first storage pool further comprises:
initiating, by the data management computing apparatus, one or more services on the one or more computing devices to provide storage capacity of the first storage pool;
sharing, by the data management computing apparatus, the storage capacity by the one or more computing devices among themselves.

6. The method of claim 1, further comprising generating, by the data management computing apparatus, a cache data store in a second memory pool of the one or more memory pools, the cache data store capable of storing at least a portion of the data, the portion of the data being frequently accessed data.

7. The method of claim 1, wherein the first storage pool comprises a persistent storage and wherein the second storage pool comprises a volatile random access memory.

8. The method of claim 1, further comprising:
providing, by the data management computing apparatus, concurrent and exclusive access to multiple users of the first storage pool in real-time using semaphores and Mutex index.

9. The method of claim 1, further comprising:
grouping, by the data management computing apparatus, similar type of data together for faster access.

10. A data management computing apparatus comprising:
a processor; and
a memory coupled to the processor, which is configured for executing programmed instructions comprising and stored in the memory to:
initialize a first storage pool capable of storing data from one or more sources, the first storage pool being distributed across one or more computing devices;
store data from the one or more sources in the first storage pool;
generate one or more memory pools in a second storage pool based on amount of data to be stored in the first storage pool and one or more parameters associated with the data stored in the first storage pool, the second storage pool being distributed across the one or more computing devices;
create metadata in a first memory pool of the one or more memory pools for the data stored in the first storage pool, the metadata capable of retrieving the data stored in the first storage pool in real-time;
identify a failure in at least one of the one or more computing devices;
circulate the information regarding the failure to the metadata stored in the first storage pool;
create one or more redundant copies of the data corrupted by the failure; and
update the metadata in response to creating one or more redundant copies of the data.

11. The apparatus of claim 10, wherein the metadata comprises at least one of a location of the data, access rights associated with the data, number of copies of the data, status of the data, retention period of the data, location of the nearest copy of the data across the one or more computing devices.

12. The apparatus of claim 10, wherein the processor coupled to the memory is further configured to be capable of executing at least one additional programmed instruction further comprising and stored in the memory to:
perform one or more operations associated with the data stored in the first storage pool; and
update the metadata in the second storage pool in response to performing the one or more operations associated with the data stored in the first storage pool.

13. The apparatus of claim 10, wherein the processor coupled to the memory is further configured to be capable of executing at least one additional programmed instruction further comprising and stored in the memory to:
receive a request to retrieve a first data from the first storage pool;
fetch a map indicative of the location of the first data in the first storage pool; and
fetch a nearest copy of the first data using the map.

14. The apparatus of claim 10, wherein the processor coupled to the memory is further configured to be capable of executing for the initializing the first storage pool at least one additional programmed instruction further comprising and stored in the memory to:
  initiate one or more services on the one or more computing devices to provide storage capacity of the first storage pool;
  share the storage capacity by the one or more computing devices among themselves.

15. The apparatus of claim 10, wherein the processor coupled to the memory is further configured to be capable of executing at least one additional programmed instruction further comprising and stored in the memory to:
  generate a cache data store in a second memory pool of the one or more memory pools, the cache data store capable of storing at least a portion of the data, the portion of the data being frequently accessed data.

16. The apparatus of claim 10, wherein the first storage pool comprises a volatile random access memory and wherein the second storage pool comprises a persistent storage.

17. A non-transitory computer readable medium having stored thereon instructions for optimally managing data in a distributed storage environment comprising executable code which when executed by a processor, causes the processor to perform steps comprising:

initializing a first storage pool capable of storing data from one or more sources, the first storage pool being distributed across one or more computing devices;
  storing data from one or more sources in the first storage pool;
  generating one or more memory pools in a second storage pool based on amount of data to be stored in the first storage pool and one or more parameters associated with the data stored in the first storage pool, the second storage pool being distributed across the one or more computing devices;
  creating metadata in a first memory pool of the one or more memory pools for the data stored in the first storage pool, the metadata capable of retrieving the data stored in the first storage pool in real-time;
  identifying a failure in at least one of the one or more computing devices;
  circulating the information regarding the failure to the metadata stored in the first storage pool;
  creating one or more redundant copies of the data corrupted by the failure; and
  updating the metadata in response to creating one or more redundant copies of the data.

* * * * *